United States Patent
Hansen (10) Patent No.: US 6,697,871 B1
(45) Date of Patent: Feb. 24, 2004

(54) SYSTEM AND METHOD FOR EFFICIENT ENCODING AND DECODING OF PROTOCOL MESSAGES

(75) Inventor: Daniel Hansen, Pompton Plains, NJ (US)

(73) Assignee: Network Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/401,118

(22) Filed: Sep. 21, 1999

(51) Int. Cl.[7] .............................................. G06F 15/16
(52) U.S. Cl. ....................... 709/234; 709/223; 709/224; 709/230; 709/233; 709/236; 709/247; 370/392; 380/268
(58) Field of Search ................................. 709/224, 223, 709/230, 234, 233, 236, 247; 707/4; 713/201; 370/392; 380/268

(56) References Cited

U.S. PATENT DOCUMENTS

| | | | |
|---|---|---|---|
| 5,245,517 A | | 9/1993 | Fenton |
| 5,365,509 A | | 11/1994 | Walsh |
| 5,418,972 A | * | 5/1995 | Takeuchi et al. ............. 709/224 |
| 5,572,533 A | | 11/1996 | Sunada et al. |
| 5,598,532 A | | 1/1997 | Liron |
| 5,659,486 A | | 8/1997 | Tamiya |
| 5,668,810 A | * | 9/1997 | Cannella, Jr. ................ 370/392 |
| 5,680,585 A | | 10/1997 | Bruell |
| 5,751,698 A | | 5/1998 | Cushman et al. |
| 5,778,360 A | * | 7/1998 | Sugita et al. ................... 707/1 |
| 5,802,309 A | * | 9/1998 | Cook et al. ................. 709/224 |
| 5,831,987 A | | 11/1998 | Spilo |
| 5,854,840 A | * | 12/1998 | Cannella, Jr. ................ 380/256 |
| 5,870,557 A | | 2/1999 | Bellovin et al. |
| 5,878,228 A | * | 3/1999 | Miller et al. ................. 709/235 |
| 5,878,420 A | | 3/1999 | de la Salle |
| 5,887,139 A | | 3/1999 | Madison, Jr. et al. |
| 5,909,550 A | | 6/1999 | Shankar et al. |
| 5,913,037 A | | 6/1999 | Spofford et al. |
| 5,916,305 A | * | 6/1999 | Sikdar et al. ................ 709/230 |
| 6,003,089 A | * | 12/1999 | Shaffer et al. ............... 370/232 |
| 6,032,197 A | * | 2/2000 | Birdwell et al. ............. 709/216 |
| 6,044,468 A | * | 3/2000 | Osmond ....................... 380/281 |
| 6,122,670 A | * | 9/2000 | Bennett et al. .............. 709/236 |
| 6,292,829 B1 | * | 9/2001 | Huang et al. ................ 707/100 |
| 6,304,914 B1 | * | 10/2001 | Deo et al. .................... 709/206 |
| 6,421,720 B2 | * | 7/2002 | Fitzgerald .................... 709/224 |

* cited by examiner

Primary Examiner—Kenneth R. Coulter
Assistant Examiner—Hai V. Nguyen
(74) Attorney, Agent, or Firm—Blakely, Sokoloff, Taylor & Zafman LLP; Christopher J. Hamaty, Esq.

(57) ABSTRACT

A system and method for the efficient encoding and decoding of protocol messages is described. In one embodiment, an offset from a beginning of a memory buffer is calculated based upon a maximum size of a header portion of the message. A variable length portion of the message is encoded beginning at the offset, and the header portion of the message is encoded based upon an encoded size of the variable portion and a size of the header portion. The encoding of the header portion begins at the offset less the encoded size of the header portion. Further, a set of object identifiers are decoded into a data structure. If a value portion corresponding to an object identifier of the set of object identifiers is variable in length, the value portion is decoded into the data structure.

14 Claims, 10 Drawing Sheets

SYSTEM AND METHOD FOR EFFICIENT ENCODING AND DECODING OF PROTOCOL MESSAGES

FIELD OF THE INVENTION

The present invention relates to network management and, more particularly, to a system and method for the efficient encoding and decoding of protocol messages.

BACKGROUND OF THE INVENTION

As conventional networks have grown in size and complexity, the need for centralized management has grown. Because of this growth, systems administrators have need to manage hardware, software, users, updates, continuations, and security on an ongoing basis.

Network management involves the active and passive monitoring of network resources for the purpose of troubleshooting problems, detecting potential problems, improving performance, documenting problems and performance, and reporting network activity. Currently, a wide variety of management applications and protocols are available. Certain network management packages use agents or probes to collect information from devices throughout the enterprise network and send the collected information back to centralized network analyzing consoles. In addition, management applications have been designed to remotely manage client systems and control local area networks, using both permanent and temporary network analyzing consoles. A network administrator, working from a network analyzing console, may produce reports and graphs concerning state of the network from the information collected by the agents.

In certain applications, the network analyzing console also acts as an agent. Network agents operate in promiscuous mode in which they monitor all traffic on the network, not just traffic that has been addressed to the particular network node. In addition, administrators may also choose to capture frames transmitted by a particular network computer that carry information for a particular application or service. The captured information is monitored to value network performance, locate bottlenecks or even track security breaches. Agents may also provide warnings of problems of performance degradation.

Basic network management applications have been built around the Simple Network Management Protocol (SNMP). An extension to this protocol is Remote monitoring (RMON) management information database (MIB). RMON is an Internet Engineering Task Force network monitoring analysis standard. Basic RMON monitors all traffic within the network on the physical layer of the network protocol stack. A newer extension, RMON2, monitors all protocol traffic within all levels of the network protocol.

RMON employs agents, sometimes referred to as probes, which are software processes running on network devices to collect information about network traffic and store the information in a local management information database (MIB). With SNMP, a network management analyzing console continuously polls the SNMP agents to obtain the MIB information, the information which is collected to monitor historical trends. SNMP management may increase congestion on the network and place a large burden on the network analyzing console to gather the information.

Within RMON, the agents may be located in network devices such as hubs, routers, and switches to collect and maintain the MIB information. The network analyzing console does not need to constantly poll the agents in order to ensure that the historical information is properly collected. Real-time data, however, needs to be polled for effective use. Within the RMON protocol, the agents may be thought of as the servers and the management network analyzing console as the client in a client/server relationship. Within RMON, SNMP provides the communication layer for transmitting information between RMON agents and the network analyzing console. SNMP encodes and decodes Protocol Data Units (PDUs) in order to communicate between network nodes.

SNMP based mid-level manager (middleware) programs need to decode hundreds to thousands of PDUs per second. This requires efficient management of both CPU and memory resources. The PDUs contain an arbitrary number of Object Identifiers (OIDs), each of which has an arbitrary length. Pre-allocating storage for the maximum number of OIDs of the maximum length quickly exhausts available memory while dynamically allocating each field as it is decoded consumes a significant amount of CPU resources. For example, in an implementation that supports simultaneous processing of up to 1000 PDUs per second, with each PDU allowed to have up to 50 OIDs, fixed pre-allocation may require up to 25,600,000 bytes of memory while dynamic allocation may require 50,000 to 100,000 dynamic memory allocations per second.

SUMMARY OF THE INVENTION

A system and method for the efficient encoding and decoding of protocol messages is described. In one embodiment, an offset from a beginning of a memory buffer is calculated based upon a maximum size of a header portion of the message. A variable length portion of the message is encoded beginning at the offset, and the header portion of the message is encoded based upon an encoded size of the variable portion and a size of the header portion. The encoding of the header portion begins at the offset less the encoded size of the header portion. Further, a set of object identifiers are decoded into a data structure. If a value portion corresponding to an object identifier of the set of object identifiers is variable in length, the value portion is decoded into the data structure.

BRIEF DESCRIPTION OF THE DRAWINGS

The objects, features and advantages of the present invention will be apparent to one skilled in the art in light of the following detailed description in which.

DETAILED DESCRIPTION

A system and method for the efficient encoding and decoding of protocol messages are described. In one embodiment, an Object Identifier (OID) component memory buffer is pre-allocated prior to decoding the Simple Network Management Protocol (SNMP) Protocol Data Units (PDUs) and which allows the memory buffer to be used on an as-needed basis.

In one embodiment, the memory buffer is allocated and an offset from a beginning of the buffer is calculated based upon a maximum size of a header portion of the PDU message. The OID variable portion of the PDU message is encoded beginning at the offset, and the header portion of the PDU message is encoded based upon an encoded size of the OID variable portion and the size of the header portion. The encoding of the header portion begins at the offset less the encoded size of the header portion. The memory buffer is placed into a control structure. In one embodiment, the control structure is passed to SNMP for processing.

Further, in one embodiment, a set of OIDs are decoded into an applicable data structure such as, for example, an array of integers. In alternate embodiments, any suitable data structure may be used. If a value portion corresponding to a particular OID is variable in length, the value portion is decoded into the data structure. In one embodiment, the data structure is passed to SNMP for further processing.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

The encoding and decoding of protocol messages are described in the context of one embodiment in which the messages are SNMP Protocol Data Units. However, it is contemplated that the present invention is not limited to PDU encoding and decoding; rather, it will be apparent that the present invention is applicable to different types of protocols and protocol messages.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Figure 1:
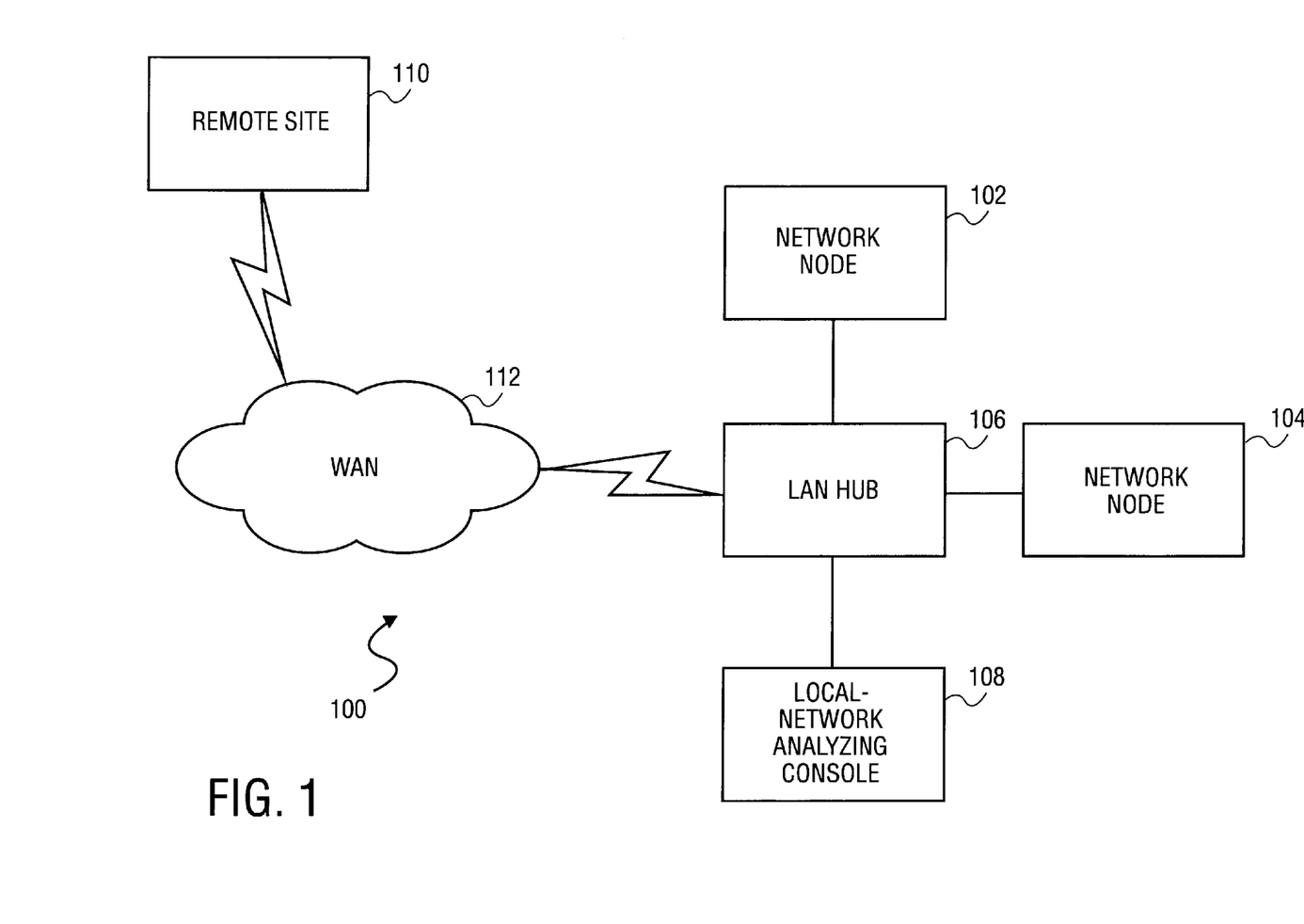
FIG. 1 is an illustration of one embodiment for a local network management monitoring system.

FIG. 1 is an illustration of one embodiment for a local-network management monitoring system 100. Within the system 100, a Local Area Network (LAN) hub 106 is connected to network nodes 102 and 104 and local-network analyzing console 108. In addition, LAN hub 106 may be connected via wide area network 112 to a remote site 110. LAN hub 106 may be connected to a variety of network nodes 102 and 104, which, in turn, may be LAN hubs. Local-network analyzing console 108 monitors all network traffic within LAN hub 106. Local-network analyzing console 108 collects data concerning traffic between and amongst network nodes 102 and 104 and LAN hub 106. In addition, any network traffic between LAN hub 106, through wide area network 112, and remote site 110 is also monitored and appropriate data collected. Middleware contained within local-network analyzing console 108 integrates, correlates, and consolidates the information in a management information database (MIB). The data is reduced to information presented on local-network analyzing console 108 through a suite of integrated fault and performance management applications.

As the number of independent nodes analyzed by a network analyzing console increases, the size and complexity of the MIB increases. The standard MIB is a database of managed objects having a hierarchical structure. The MIB contains information concerning the managed objects of the network. A managed object is a local representation of a physical entity on the network. Each managed object monitors and collects information, such as the number of packets that have been received, and transmits the information to the network analyzing console upon request. The standard MIB is defined by the Structure of Management Information (SMI), which provides the tools for creating and identifying data types and data representations. Data types may include integer values, network addresses, counters, gauges, time ticks, and table information. SMI also defines a hierarchical naming structure to identify each managed object. Objects are assigned names and allocation in the hierarchical structure that helps identify what the object does.

Figure 2:
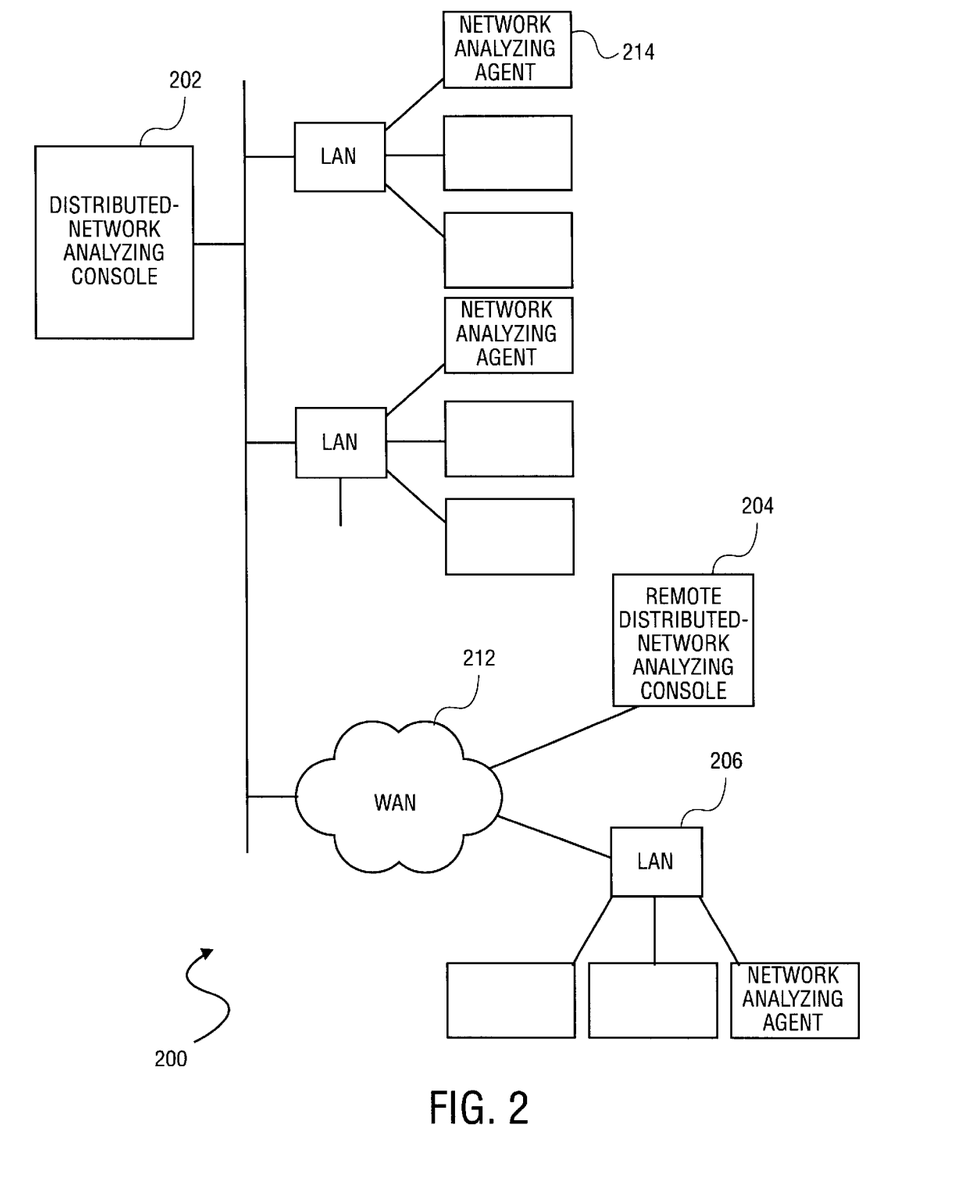
FIG. 2 is an illustration of one embodiment for a distributed network management monitoring system.

FIG. 2 is an illustration of one embodiment for a distributed network management monitoring system 200. Within distributed system 200, a distributed-network analyzing console 202 collects information from a wide source of local area networks connected locally to distributed-network analyzing console 202 and via wide area network 212 from a plurality of remote distributed-network analyzing consoles 204 and distributed local area networks 206. Any of a variety of local area networks both connected directly to the distributed-network analyzing console 202 and via wide area network 212 may be integrated into the system. A number of network analyzing agents 214, both local and distributed, gather data and send the data to the distributed network analyzing console 202.

The data is collected and stored in a management information database, processed and converted. The distributed-network analyzing console 202 updates the network object module which is the reference module that maintains the current status of all processes, data flows, and network elements within the overall system. Each remote distributed-network analyzing console 204 and distributed-network analyzing console 202 stores data gathered only within its domain of control. However, data may be communicated and shared between the various network analyzing consoles. In an alternate embodiment, all data may be stored within one distributed-network analyzing console 202. Once data is consolidated and processed into meaningful information, remote distributed-network analyzing console 204 sends information to the distributed-network analyzing console 202. Distributed-network analyzing console 202 formats and displays the data in a format that can be easily manipulated and acted upon.

Network monitoring in analysis applications maintained within distributed-network analyzing console 202 and remote distributed-network analyzing console 204 detect, diagnose, and isolate potential problems on the network. For a series of processing functions, these applications help systems managers determine appropriate corrective action. Performance management tools offer a variety of capabilities such as baselining networks, analyzing network utilization and trends, and identifying performance bottlenecks. In addition, any of a variety of performance management tools may be implemented. Fault and performance management systems interpret major LAN 206 and WAN 212 protocols used throughout the enterprise including encapsulating LAN protocols over leased lines, frame relay and X.2.5 for example. In addition, fault performance management locates problems, identifies unique Internet work characteristics, and uses expert analysis to automatically recommend quick problem resolution. In addition, the tools display complete protocol interpretation in clear, concise languages and provide Internet work bandwidth statistics that indicate utilization based on LAN protocols as well as end users.

Figure 3:
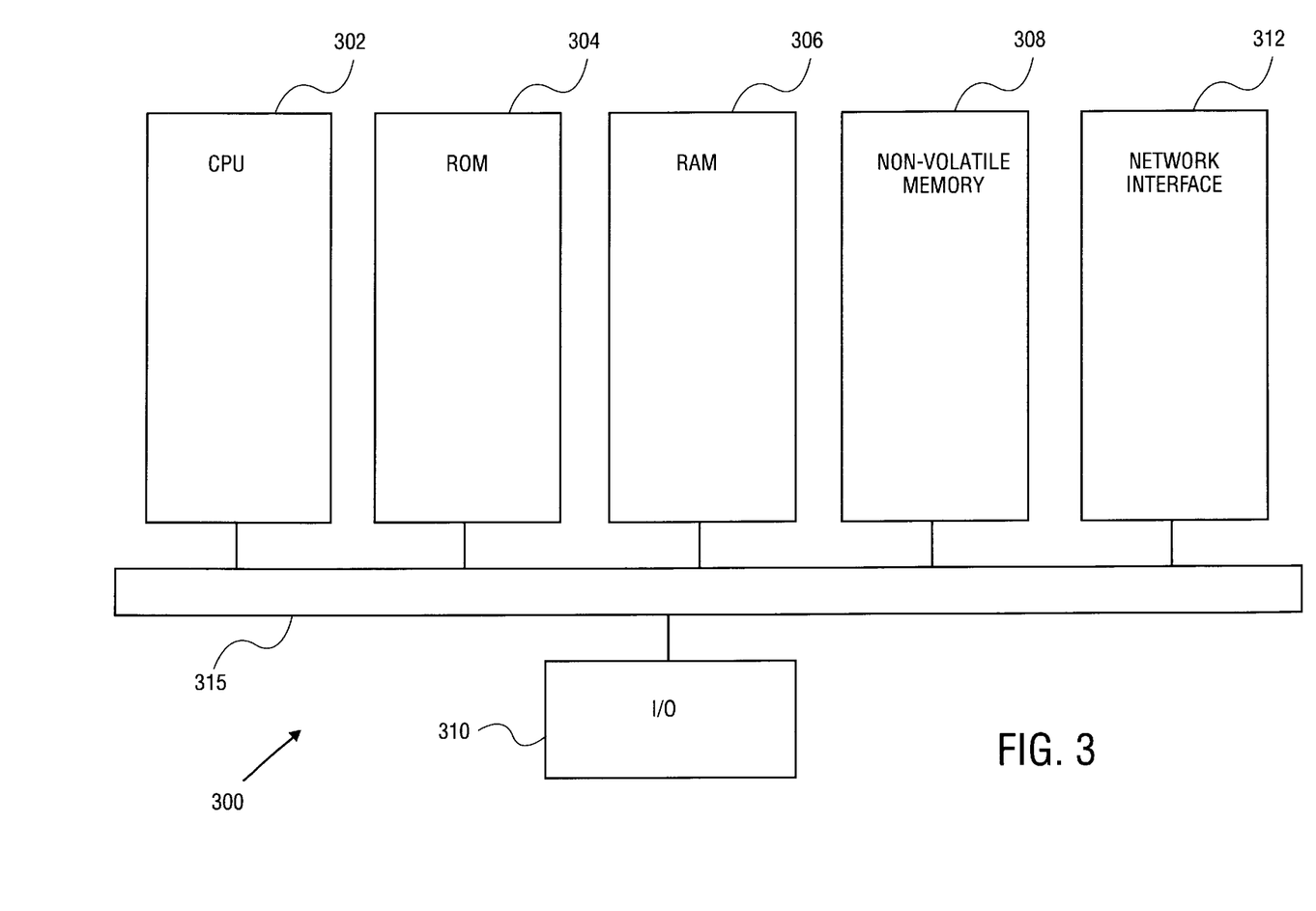
FIG. 3 is a block diagram illustrating one embodiment of an architecture of a computer system.

FIG. 3 is a block diagram illustrating one embodiment of an architecture for a network analyzing console 300. The FIG. 3 embodiment contains CPU 302, read only memory (ROM) 304, random access memory (RAM) 304, random access memory (RAM) 306, non-volatile memory 308, input/output 310, and network interface 312. The various components are connected via bus 315. At network analyzing console 300 start-up, CPU 302 loads network management software and software drives from non-volatile memory 308 into RAM 306. In addition, CPU 302 allocates and initializes the management information database (MIB) in RAM 306. Network interface 312 is used by network analyzing console 300 to communicate with the various agents on the network. Network analyzing console 300 may be either a local-network analyzing console 108, a distributed-network analyzing console 202, or remote distributed-network analyzing console 204.

Figure 4:
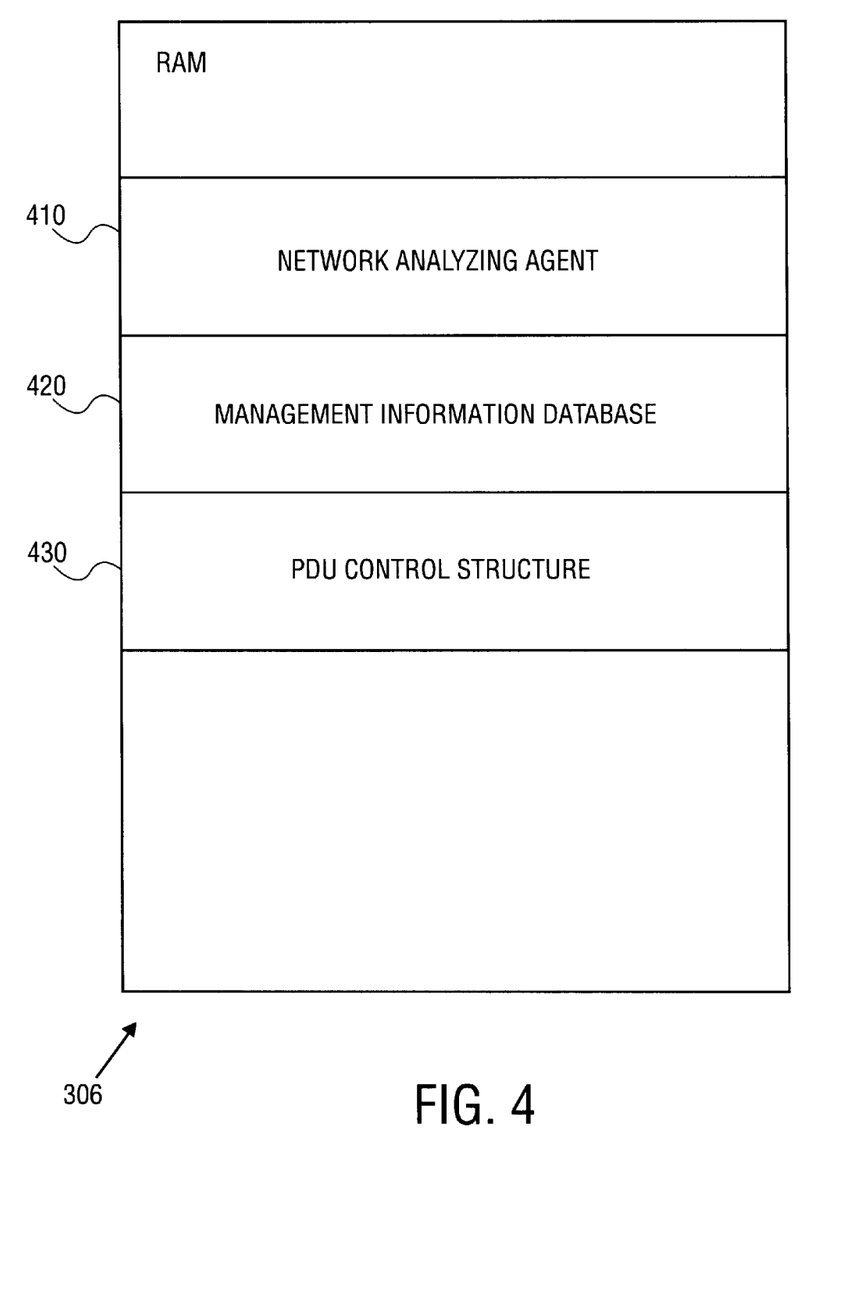
FIG. 4 is block diagram showing one embodiment of the random access memory of FIG. 3.

FIG. 4 is a block diagram showing one embodiment of random access memory (RAM) 306 of FIG. 3. In one embodiment, RAM 306 contains network analyzing agent 410, management information database (MIB) 420, and Protocol Data Unit (PDU) control structure 430. Network analyzing agent 410 contains software routines for analyzing and monitoring network traffic within network 100 or network 200. MIB 420 is utilized by network analyzing agent for storing the network traffic information collected by network analyzing console 300. PDU control structure 430 is utilized by network analyzing agent 410 for the efficient coding and decoding of network messages.

Figure 5:
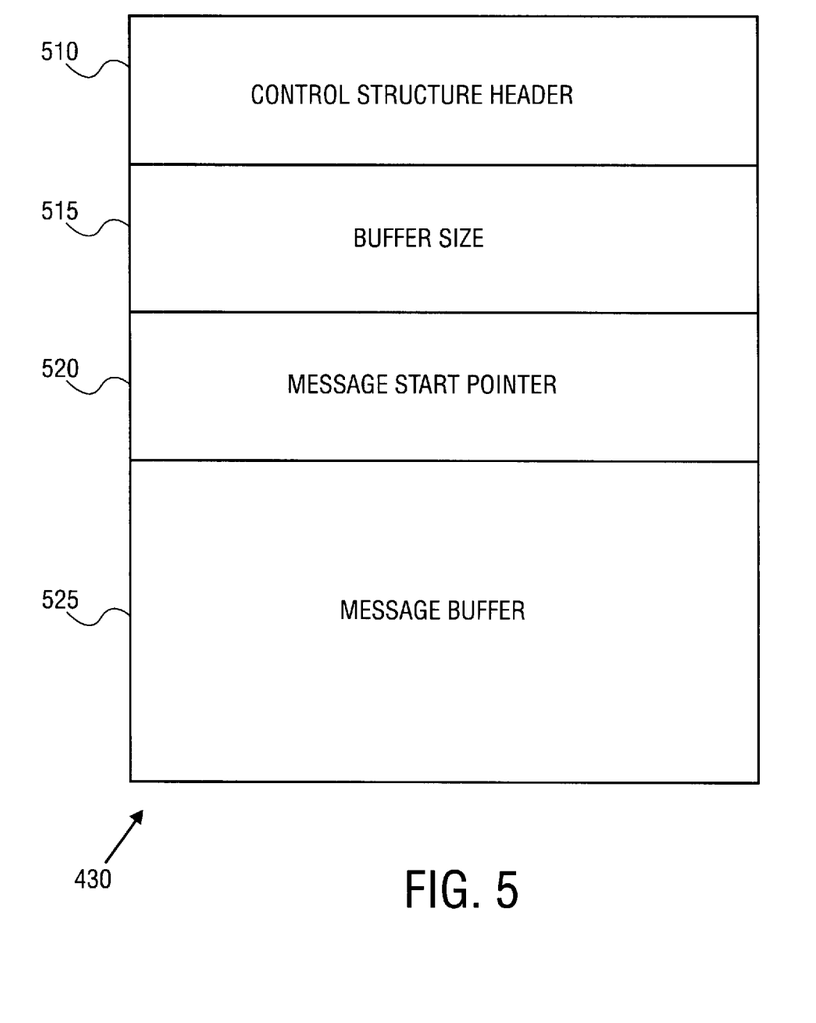
FIG. 5 is a block diagram showing one embodiment of a PDU control structure of FIG. 4.

FIG. 5 is a block diagram showing one embodiment of PDU control structure 430. PDU control structure 430 contains control structure header 510, buffer size 515, message start pointer 520, and message buffer 525. In one embodiment, the entire PDU control structure 430 is passed to SNMP in order to transmit information between various nodes on the network.

In an alternate embodiment, PDU control structure 430 may contain a control structure header, a buffer pointer, and message pointer in which the buffer and message are maintained in separate areas of memory. In this embodiment, only the pointers to the message are passed to the SNMP routines for processing rather than the message itself.

Figure 6:
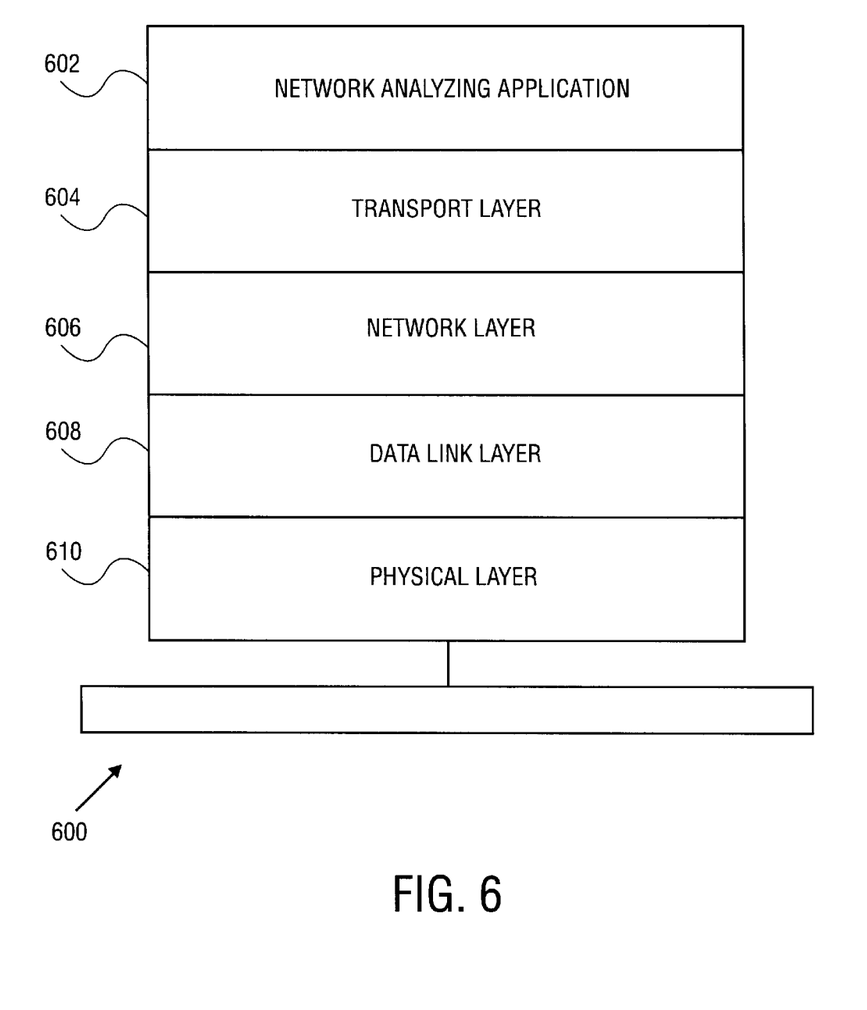
FIG. 6 is a block diagram illustrating one embodiment of network monitoring protocol layers.

FIG. 6 is a block diagram illustrating one embodiment of network monitoring protocol stack 600. Network monitoring protocol stack 600 contains network monitoring application layer 602, transport layer 604, network layer 606, data link layer 608, and physical layer 610.

Network monitoring application layer 602 may consist of standard IP host applications such as file transport protocol (FTP), hypertext transfer protocol (HTTP), and telnet and the network monitoring application software to monitor the network traffic. These and other application protocols make use of the services of standard transport protocols such as transmission control protocol (TCP) and user datagram protocol (UDP) contained within transport layer 604. Both TCP and UDP make use of standard services of Internet protocol (IP) at the network layer 606. Between network layer 606 and physical layer 610 is data link layer 608. Data link layer 608 specifies the protocol for communicating frames of data between various network stations using the transport protocol.

As information passes down through the layers of the protocol stack 600, each layer encapsulates the information in the form of a Protocol Data Unit (PDU). Entries in each layer encapsulate prior information with new protocol control information into the PDU. When PDUs arrive at another network node, the PDU moves up through the layers of the protocol stack 600 and the information for each layer is stripped off the PDU and passed to the appropriate layer entity.

SNMP encodes and decodes hundreds of thousands of PDUs per second. This requires the efficient management of both CPU and memory resources. The PDUs contain an arbitrary number of object identifiers (OID), each of which have an arbitrary length.

Data packets are received through the physical layer and up through the various layers of protocols stack 600. Network monitoring application 602 monitors the various traffic messages that occur along the physical layer 610. As data traffic moves through the network, each node on the network may "sniff" or monitor the traffic on all nodes. Network monitoring application 602 operates in a promiscuous node in which it monitors all traffic on the network. The traffic passes through the physical layer 610 of each node and is sent by the various protocol layers within protocol stack 600. Network monitoring application 602 monitors the traffic and maintains the traffic information in MIB 420. Network monitoring application 602 then displays the traffic and various statistics regarding the traffic along the network on I/O 310. In an alternate embodiment, the data is collected and transferred to a distributed-network analyzing console 202 for display. In one embodiment, local-network analyzing console 108 displays and analyzes the collected data. Network monitoring application 602 detects, diagnoses, and isolates potential problems on the network. Application 602 then processes the data to determine the appropriate action and makes recommendations for the appropriate corrective action. In one embodiment, the application 602 baselines network activity, analyzes network utilization and trends, and identifies performance bottlenecks.

In one embodiment, the monitoring activities are a subset of the remote monitoring (RMON) standard. This standard provides managers with real-time network and application data. Within the RMON standard, probes located in network devices such as hubs, routers, and switches collect and maintain historical information. The network management console does not need to constantly pull probes in order to ensure that historical information is properly collected. Within the RMON scheme, the probes are servers and the management console is the client in the client/server relationship. Simple network management protocol (SNMP) provides the communication layer for transmitting information between RMON probes and management consoles.

RMON notifies the user that problems exist. In one version, the RMON standard addresses only the physical layers of a network such as physical layer 610 and data link layer 608 (the basic connectivity of cables, hubs and related devices). In this version, RMON does not provide any information concerning the network layer 606, transport layer 604 or applications layer 602. A later version, RMON2, provides information all the way up through the application layer 602. Although RMON and RMON2 provide detailed information concerning network traffic, neither provide the tools necessary for the analysis of the data and efficient means for maintaining the MIB 420.

Figure 7A:
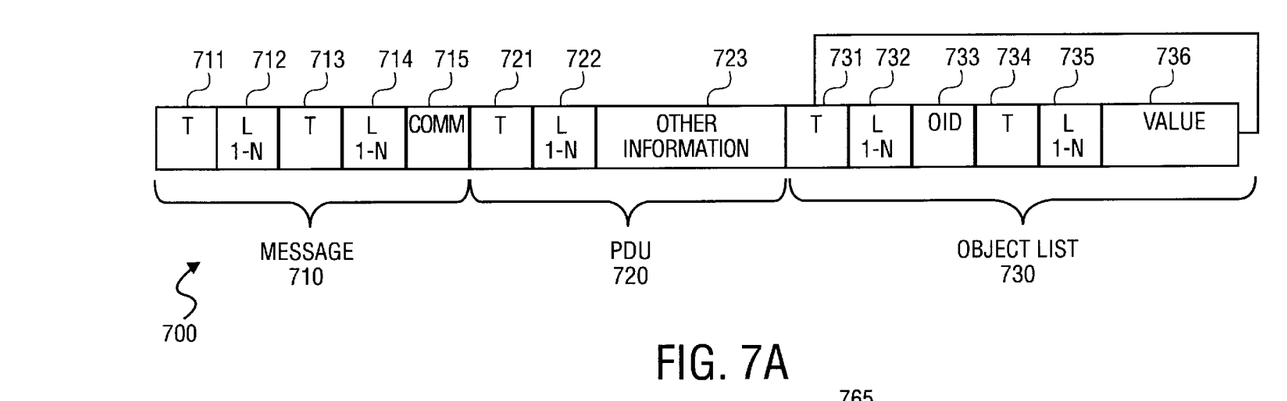
FIG. 7a is a block diagram showing a PDU message buffer.

FIG. 7a is a block diagram showing a Protocol Data Unit (PDU) 700. In one embodiment, PDU 700 contains message area 710, PDU information area 720 and object list 730. In one embodiment, object list 730 is an SNMP varbind list. Message area 710 contains tags 711 and 713 as well as a variable length area 712 and 714. The variable length areas 712 and 714 encapsulate not only the message area 710 but also PDU area 720 and object list 730. PDU area 720 contains a length area 722 which is a variable length area for the length of the remaining portion of the PDU area 723 and the entire object list 730. Object list 730 contains variable length area 732 and 735 for the encapsulated object list and the list item. In addition, the OID 733 is also within the object list 730. Object list 730 contains a variable number of objects, each object being variable in length. Until PDU 700 is encoded, the size of a variable length area 712, 714, 722, 732 and 735 are undefined. During PDU 700 creation, the size of length area 722 is unknown and may vary from 1 to n bytes in length.

Figure 7B:
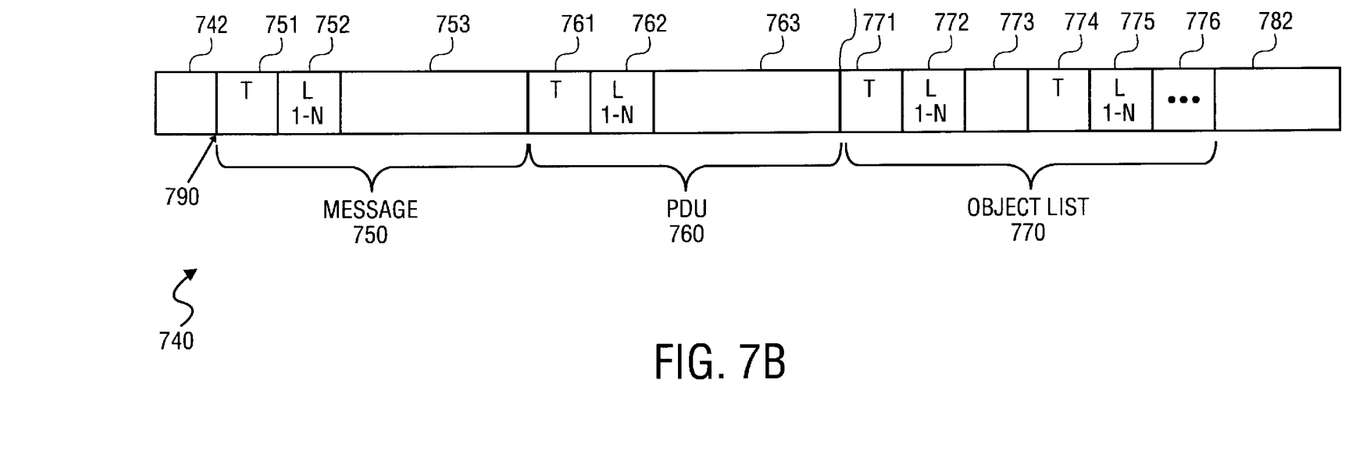
FIG. 7b is a block diagram showing another embodiment of a PDU message buffer.

FIG. 7b is a block diagram showing one embodiment of PDU message buffer 740. Message buffer 740 contains message area 750, which is pre-allocated to contain excess buffer area 742, tag 751, variable length area 752, and the remaining message area 753. During encoding of the PDU information, buffer 740 is pre-allocated to contain enough memory to contain a maximized PDU. In one embodiment, buffer 740 is 4 kilobytes. Initially, maximum possible PDU area 760 and maximum possible message area 750 are determined. These two values determine PDU offset 765. The object list 770 is built from the PDU offset 765. Thus, PDU offset 765 is always at a fixed position from the beginning of buffer 740. Once the object list 770 is built, the length 762 of the encapsulated PDU and object list is calculated. The object list area 770 is built in a buffer area that is calculated at a maximum amount. In one embodiment, the maximum buffer size is allocated at 4 kilobytes. The message area 750 is placed in a buffer area that is calculated at a maximum amount for the message area. In one embodiment, the entire message 740 is built for the message area. Once the message 740 is built, a start pointer 520 is pointed to the beginning of the message 790 and the buffer size is loaded into the buffer size area 515. Control structure header 510 is built and PDU control structure 430 is passed to SNMP for processing. The FIG. 7b embodiment requires approximately 3,000,000 bytes of memory for up to 1,000 PDUs 700 per second with each PDU 700 allowed up to 50 objects within the object list 730.

Figure 8:
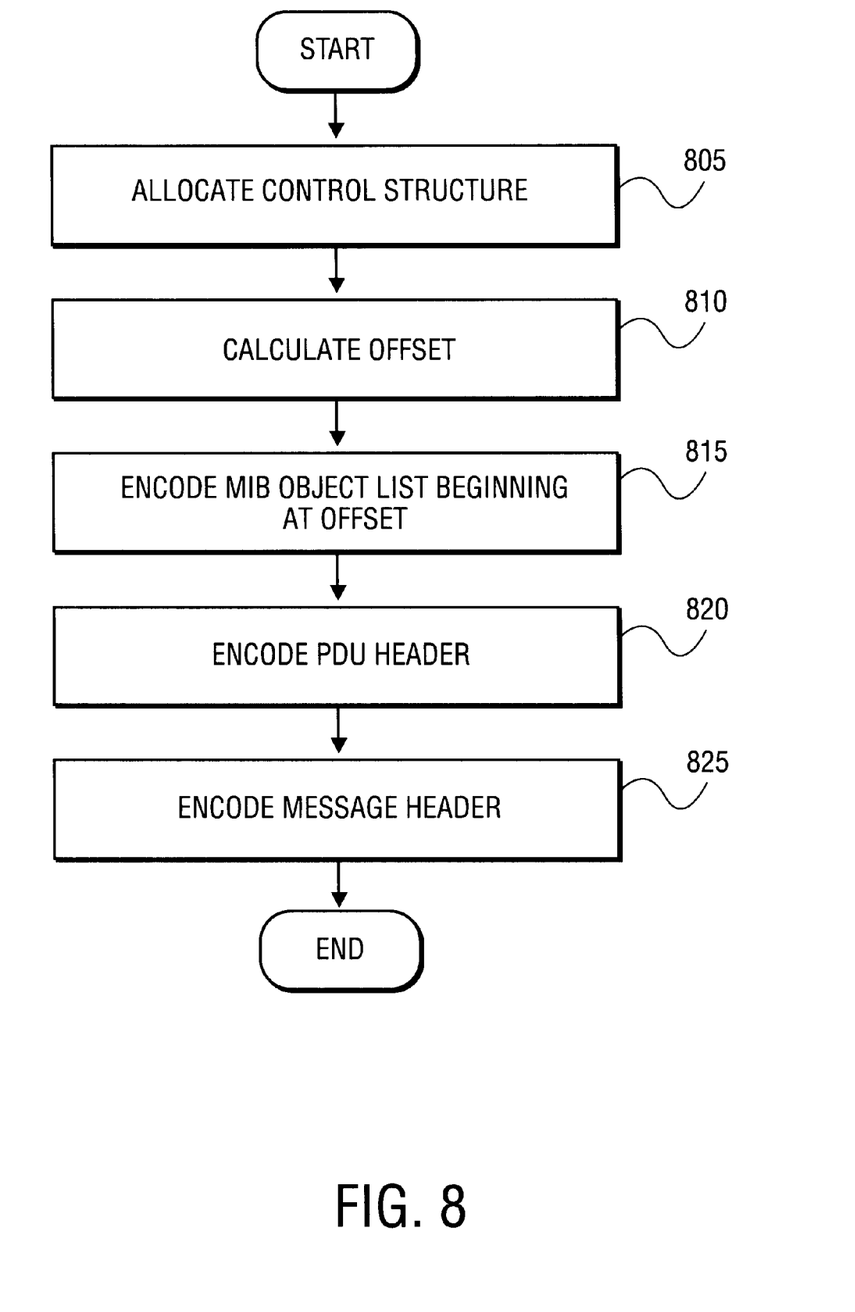
FIG. 8 is a flow diagram of one embodiment for the encoding of the PDU control structure of FIG. 5.

FIG. 8 is a flow diagram of one embodiment for the encoding of the PDU control structure 430. Initially at processing block 805, control structure 430 is allocated. In one embodiment, PDU buffer 740 is allocated as 4 kilobytes. In one embodiment, a maximum header length is calculated based on a maximum sizes for variable length area 762 and variable length area 752, together with the remaining fields of message area 750 and PDU area 760. An average maximized size for object list 770 is defined. The maximum header length and average maximized object list length are combined, together with an overage amount, to arrive at the buffer size. The message buffer 525 size is combined with the sizes of control structure header 510, buffer size 515, and message start pointer 520 to arrive at the size for control structure 430.

Next at processing block 810, the offset of the PDU 765 area is determined. In one embodiment, the offset is equal to the maximum message size plus PDU header 763.

At processing block 815, the object list beginning at the offset is encoded. Each object is encapsulated in object list 770, starting at PDU offset 765. In one embodiment, the maximum buffer size is determined based on a maximum of 40 objects within object list 770. In certain situations, the object list 770 contains a number of null objects. For example, during get requests, the values are all null in the object list 770. In one embodiment, if the values are null, a fast object list 770 encoding operation is performed. In this embodiment, all the values are known ahead of time and the object list 770 is limited to an encoded length of less than 127 bytes. Therefore, the length areas of the PDU 762 and message 752 are all one byte in length. Therefore, prior to encoding the object list 770, the type of request is determined first.

At processing block 820, the PDU header information is encoded. Variable length field 762 is calculated based upon the size of object list 770, PDU offset 765 and the length of area 763.

At processing block 825, message area 750 is encoded. After encoding the message header, the entire message buffer is placed into message buffer 525 as described above.

In one embodiment, the message request ID is sequentially encoded beginning at 0 to a maximum value. In one embodiment, this maximum value is 10,000,000. In an alternate embodiment, the request ID is initialized at 1,000,000 and runs to a maximum of 2,000,000 requests. In this embodiment, when the PDU 740 is encoded, a pointer is stored to the request ID. The MIB table in the RMON is a fixed number of objects which are polled every five seconds. In certain situations, only the request ID changes from one poll to the next. Thus, when a request is to be resent and repolled and only the request ID changes, the embodiment resends the prior PDU 740 with only the request ID updated. Thus, the PDU remains unchanged except for the request ID. If the range is not restricted, then the request ID field may vary in size, precluding the ability to modify the message in place.

Figure 9:
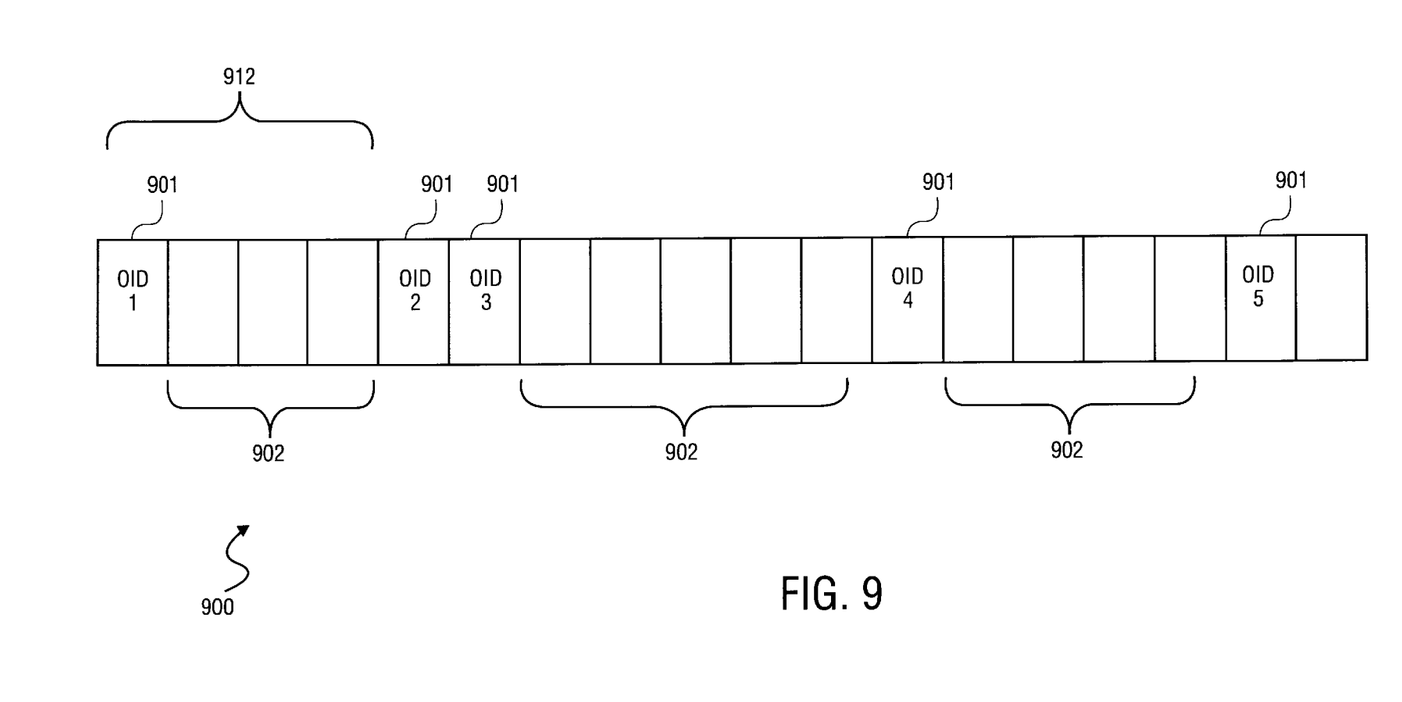
FIG. 9 is a block diagram showing one embodiment of an object decode buffer.

FIG. 9 is a block diagram showing one embodiment of an object decode buffer 900. The object decode buffer 900 is composed of a number of objects from the variable list during decode. Each object 912 contains an object identifier 901 and a variable number of blocks of data 902. Each object identifier 901 comprises from 0 to 128 components. A component may be a fixed length data or an object string of up to 1 kilobyte in length. For a given object list 770, any of a variety of objects 912 may be decoded. In one embodiment, a maximum of 40 objects 912 are contained within any given variable list 770. For a given variable list 770, each object 912 may be a maximum of 4 bytes. If the OID contains 128 components 902, for a maximum of 40 objects 912, a maximum of 60 kilobytes of memory is required for each decoding. SNMP decodes hundreds of thousands of PDUs per second. This requires efficient management of both CPU and memory resources. Each SNMP PDU contains an arbitrary number of object identifiers 901, each of which has an arbitrary length. Preallocating storage for the maximum number of identifiers 901 for the maximum length quickly exhausts available memory while dynamically allocating each field consumes a significant amount of CPU time. In one embodiment, a maximum memory buffer of 4K is allocated. In alternate time. In one embodiment, a maximum memory buffer of 4K is allocated. In alternate embodiments, any suitable buffer size may be allocated. In one embodiment, a maximum number of identifiers 901 are known. The FIG. 9 embodiment is an array of integers wherein each identifier 901 and each value 902 begins on a word boundary within the 4 byte buffer. In the FIG. 9 embodiment, only object identifiers 901 and octet strings are placed into the buffer. In this embodiment, fixed length values are decoded directly into fixed memory.

Figure 10:
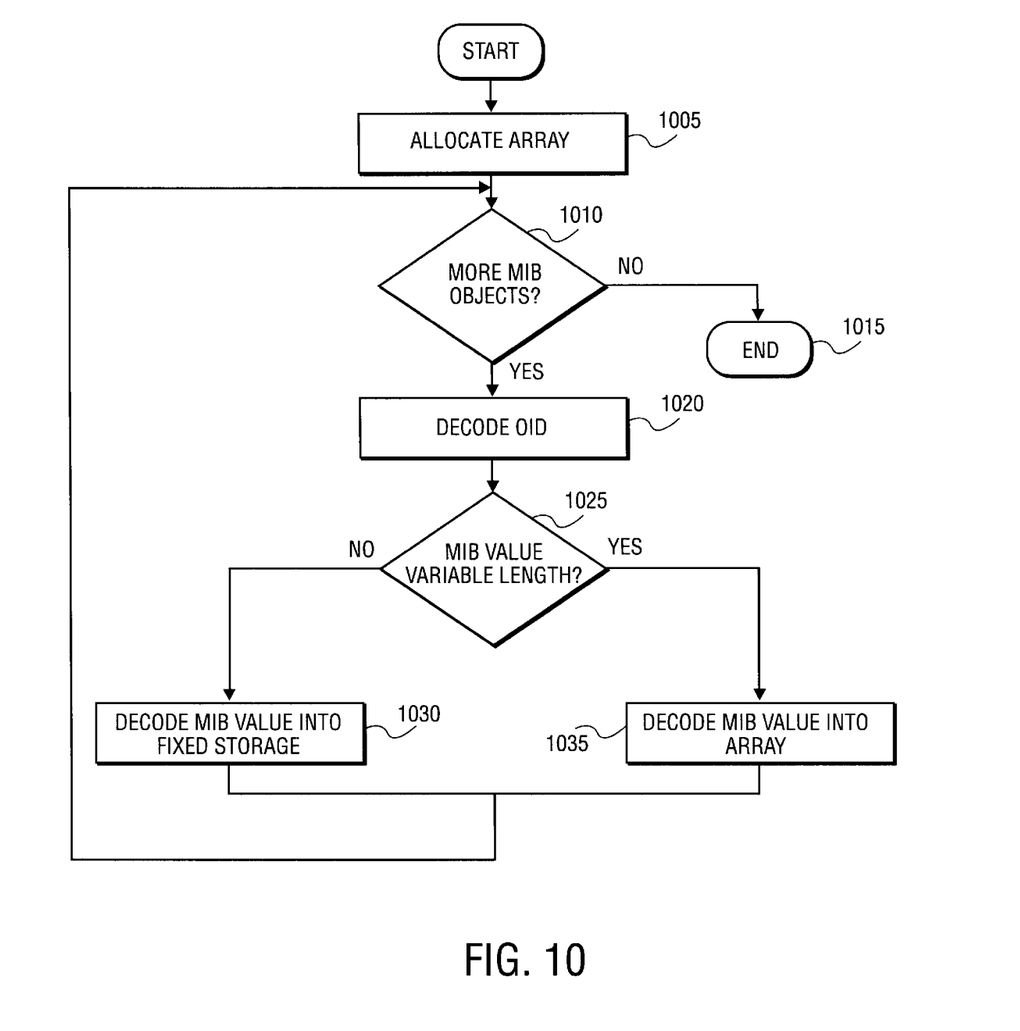
FIG. 10 is a flow diagram illustrating one embodiment for the decoding of management information buffer objects.

FIG. 10 is a flow diagram illustrating one embodiment for the decoding of management information buffer objects. Initially at step 1005 the OID buffer 900 is allocated. In one embodiment, a 4K buffer is allocated for each variable list 770.

Next at processing block 1010, it is determined whether additional MIB objects are required to be decoded. If no more objects are to be decoded, processing ends at processing block 1015.

If more objects are to be decoded, the object is decoded at processing block 1020. In one embodiment, only octet strings are decoded into buffer 900. Next at processing block 1025, it is determined whether the object has a variable length octet string. If at processing block 1025 it is determined that the object is an octet string, the MIB object is decoded into buffer 900 at step 1035. However, if the object has a fixed length, the object is decoded directly into fixed storage at processing block 1030. The buffer 900 is passed to SNMP for further processing. Processing then returns to processing block 1010 to determine if more objects are to be decoded.

The specific arrangements and methods herein are merely illustrative of the principles of this invention. Numerous modifications in form and detail may be made by those skilled in the art without departing from the true spirit and scope of the invention.

What is claimed is:

1. A method of encoding protocol messages comprising:

calculating an offset from a beginning of a memory buffer based upon a fixed maximum size of a header portion of the messages;

encoding a variable length portion of each message beginning at the offset; and encoding the header portion of each message based upon an encoded size of the variable length portion and a size of the header portion, said encoding of the header portion beginning at the offset less the encoded size of the header portion.

2. The method of claim 1 further comprising:

encoding a message header of each message based upon the encoded size of the variable length portion, an encoded size of the header portion, and a size of a message portion, said encoding a message header beginning at the offset less the size of the header portion and less the size of the message portion.

3. The method of claim 1 further comprising:

allocating the memory buffer based upon a maximum size of the protocol messages.

4. The method of claim 3 wherein the maximum size of the messages is the minimum of an encoded-buffer-maximum length or an optimized length, said optimized length is a maximum length of the header portion plus a maximum encoded variable length portion length times the average number of variable length portions in the messages.

5. A system for encoding protocol messages comprising:

means for calculating an offset within a memory buffer based upon a fixed maximum size of a header portion of the messages;

means for encoding a variable length portion of each message beginning at the offset; and means for encoding the header portion of each message based upon an encoded size of the variable length portion and a size of the header portion, said means for encoding of the header portion beginning at the offset less the encoded size of the header portion.

6. A system for encoding protocol messages comprising:

a memory buffer for storing said messages, each of said messages having a header portion and a variable length portion;

an offset from the beginning of the memory buffer, said offset based upon a fixed maximum size of the header portion; and a network analyzing agent for encoding the variable length portion of a message beginning at the offset, and for encoding the header portion of the message based upon an encoded size of the variable length portion and a size of the header portion, said encoding of the header portion beginning at the offset less the encoded size of the header portion.

7. The system of claim 6 wherein the analyzing agent further encodes a message header of the message based upon the encoded size of the variable length portion, an encoded size of the header portion, and a size of a message portion, said header is encoded beginning at the offset less the size of the header portion and less the size of the message portion.

8. The system of claim 6 wherein the analyzing agent allocates the memory buffer based upon a maximum size of the protocol messages.

9. The system of claim 8 wherein the maximum size of the messages is the minimum of an encoded-buffer-maximum length or an optimized length, said optimized length is a maximum length of the header portion plus a maximum encoded variable length portion length times the average number of variable length portions in the messages.

10. An article of manufacture including one or more computer-readable media with executable instructions therein, which when executed by a processing device causes the processing device to:

calculate an offset from a beginning of a memory buffer based upon a fixed maximum size of a header portion of protocol messages;

encode a variable length portion of each message beginning at the offset; and encode the header portion of each message based upon an encoded size of the variable length portion and a size of the header portion, said encoding of the header portion beginning at the offset less the encoded size of the header portion.

11. The medium of claim 10 wherein the processing device encodes a message header of each message based upon the encoded size of the variable length portion, an encoded size of the header portion, and a size of a message portion, said encoding a message header beginning at the offset less the size of the header portion and less the size of the message portion.

12. The medium of claim 10 wherein the processing device allocates the memory buffer based upon a maximum size of the protocol messages.

13. The medium of claim 12 wherein the maximum size of the messages is the minimum of an encoded-buffer-maximum length or an optimized length, said optimized length is a maximum length of the header portion plus a maximum encoded variable length portion length times the average number of variable length portions in the messages.

14. A memory for storing data for access by an application program being executed on a data processing system, comprising:

a data structure stored in said memory, said data structure including information resident in a database used by said application program and including, a plurality of memory buffers used for the encoding of protocol messages, wherein each memory buffer includes, an offset within the buffer based upon a fixed maximum size of a header portion of the protocol messages, and a variable length portion of each protocol message that is encoded beginning at the offset, wherein said header portion is encoded based upon an encoded size of the variable length portion and a size of the header portion, said header portion is encoded beginning at the offset less the encoded size of the header portion.

* * * * *